(12) United States Patent
Dugan et al.

(10) Patent No.: US 7,804,775 B2
(45) Date of Patent: Sep. 28, 2010

(54) APPARATUS AND COMPUTER PROGRAM FOR IDENTIFYING SELECTED APPLICATIONS UTILIZING A SINGLE EXISTING AVAILABLE BIT IN FRAME HEADERS

(75) Inventors: Robert J. Dugan, Hyde Park, NY (US); Daniel G. Eisenhauer, Austin, TX (US); Giles R. Frazier, Austin, TX (US); William J. Rooney, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 12/205,502

(22) Filed: Sep. 5, 2008

(65) Prior Publication Data
US 2009/0003233 A1 Jan. 1, 2009

Related U.S. Application Data

(63) Continuation of application No. 10/937,669, filed on Sep. 9, 2004, now Pat. No. 7,433,306.

(51) Int. Cl.
*H01R 31/08* (2006.01)
*H04J 1/16* (2006.01)

(52) U.S. Cl. .................. 370/230; 370/252; 370/253
(58) Field of Classification Search .................. None
See application file for complete search history.

(56) References Cited

U.S. PATENT DOCUMENTS

| 6,975,617 | B2 * | 12/2005 | Walker et al. ............... 370/349 |
| 2005/0220028 | A1 * | 10/2005 | Botkin et al. ............... 370/241 |

\* cited by examiner

*Primary Examiner*—Raj Jain
(74) *Attorney, Agent, or Firm*—Yee & Associates, P.C.; Diana R. Gerhardt

(57) ABSTRACT

An apparatus and computer program are disclosed for collecting data about the transmission of network packets that are associated with specified applications. The packets are transmitted through a communications network fabric that is used to couple data processing systems together. A particular existing single bit in a frame header definition is selected. The bit is defined as part of the standard frame header by a communication protocol as an available bit in the frame header. The standard protocol is unchanged by the selection of this bit. An application is specified to be monitored. The selected bit is then set in each network packet that is generated by the specified application. The fabric collects performance data for each packet that has the bit set. Thus, the fabric collects performance data about a transmission of each packet that is generated by the application when that application is setting the bit.

11 Claims, 9 Drawing Sheets

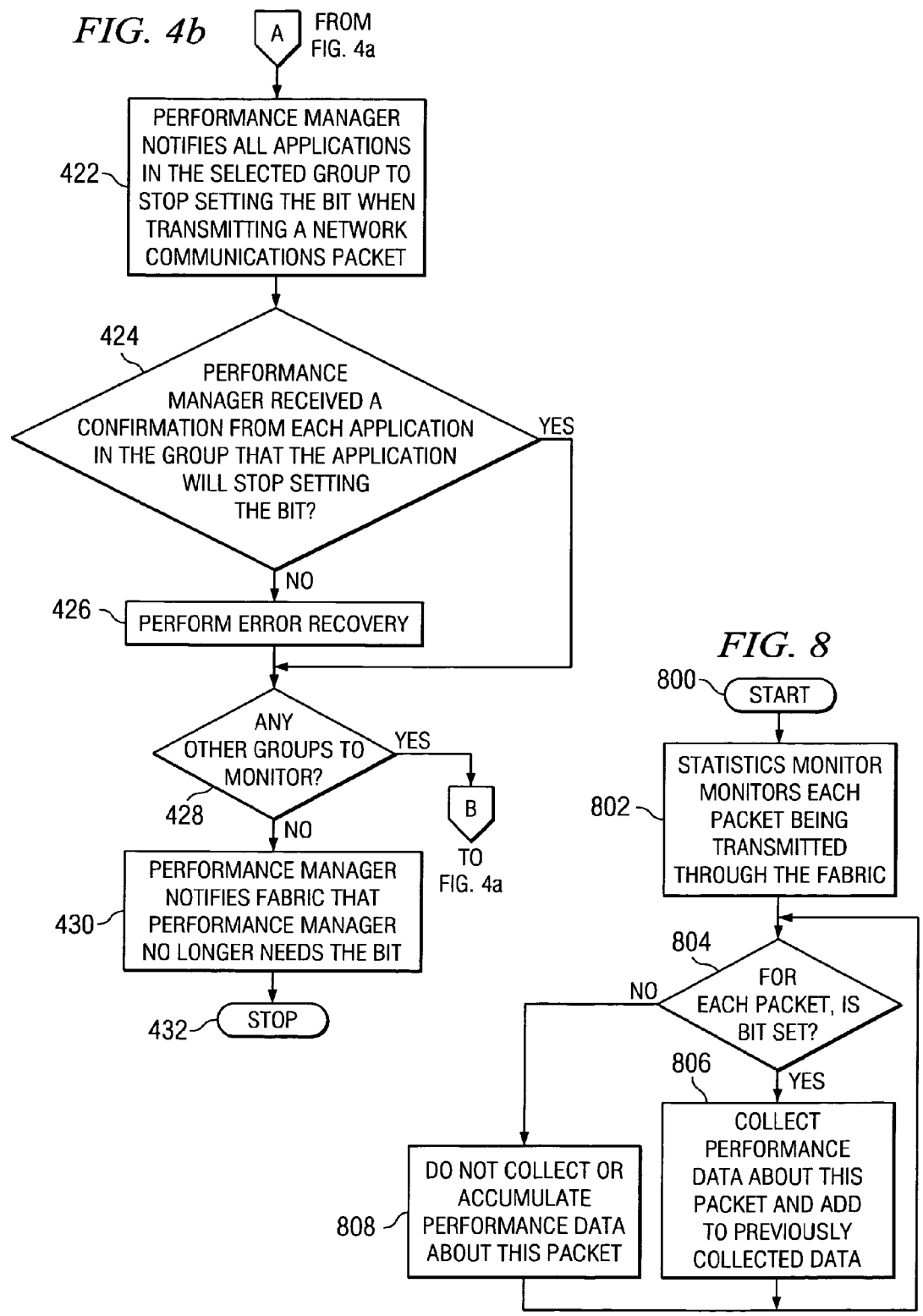

APPARATUS AND COMPUTER PROGRAM FOR IDENTIFYING SELECTED APPLICATIONS UTILIZING A SINGLE EXISTING AVAILABLE BIT IN FRAME HEADERS

This application is a continuation of application Ser. No. 10/937,669, filed Sep. 9, 2004, status allowed.

BACKGROUND OF THE INVENTION

1. Technical Field

The present invention is directed to data processing systems. More specifically, the present invention is directed to a method, apparatus, and computer program product for identifying selected applications by utilizing a single bit in network packet frames generated by the applications where the bit is already defined by the communications protocol.

2. Description of Related Art

Fibre Channel is a high performance serial interconnect standard designed for bi-directional, point-to-point communications between servers, storage systems, workstations, switches, and hubs. It offers a variety of benefits over other link-level protocols, including efficiency and high performance, scalability, simplicity, ease of use and installation, and support for popular high level protocols.

Fibre channel employs a topology known as a "fabric" to establish connections (paths) between ports. A fabric is a network of switches for interconnecting a plurality of devices without restriction as to the manner in which the switches can be arranged. A fabric can include a mixture of point-to-point, circuit switched, and arbitrated loop topologies.

In Fibre channel, a path is established between two nodes where the path's primary task is to transport network packets from one point to another at high speed with low latency, performing only simple error correction in hardware. The fibre channel switch provides flexible circuit/packet switched topology by establishing multiple simultaneous point-to-point connections. Because these connections are managed by the switches or "fabric elements" rather than the connected end devices or "end nodes", fabric traffic management is greatly simplified from the perspective of the device.

As storage area networks (SANs) grow in size, in terms of the number of switches in the configuration and the link distances to be supported, it becomes necessary to continuously monitor SAN performance and make corresponding adjustments to the SAN on an ongoing basis. A SAN may be implemented utilizing a Fibre channel fabric to transmit network packets among the various nodes in the SAN. In order to support such performance monitoring, it is not only necessary for applications that use the SAN to monitor performance metrics such as end-to-end transfer time, but it is also necessary for the SAN itself to monitor performance of internal SAN components. The information obtained from this form of monitoring is important for the user in assuring that goals and objectives of critical workloads are being achieved. For example, there can be congestion among cascaded switches in the SAN that causes frame traffic to be delayed and queue depths to increase.

In order to make the proper adjustments to maintain or improve SAN performance, the SAN components in which delays are occurring need to be identified as well as the processes that may be overloading the SAN and causing delays. To do this, it is desirable to have performance data collected on selected groups of network frames that are traversing the SAN, such as all network frames that were generated by selected applications. However, there is no way for the SAN to identify the application that generated a particular frame. Thus, it is not possible for the SAN to collect data on a per-application basis.

One prior method of solving this problem has been to modify the protocol's definition of a frame header to add a new group parameter to the definition. The group parameter would have to be implemented utilizing multiple bits that are added to the definition of the standard frame header. This group parameter could then be used to identify a particular application or a group of applications.

This method has serious disadvantages. The method requires multiple bits. For example, six bits would be required to identify 64 different applications or application groups. This method would require the extension of the current frame header which would result in fundamental changes to existing hardware or would cause interoperability issues when attaching old hardware to new hardware that implemented the six-bit extension. This method would result in the increase of the link bandwidth consumed by frame headers and a corresponding decrease in the available bandwidth for application data. In addition, to support 64 applications or application groups would mean that switches in the fabric would have to reserve space to accommodate an additional 64 counters per metric.

Therefore, a need exists for a method, apparatus, and computer program product for identifying selected applications or application groups utilizing a single bit in the communications frames generated by the applications where the bit has already been defined by the standard communications protocol.

SUMMARY OF THE INVENTION

An apparatus and computer program are disclosed for collecting data about the transmission of network packets that are associated with specified applications. The packets are transmitted through a communications network fabric that is used to couple data processing systems together. A particular existing single bit in a frame header definition is selected. The bit is defined as part of the standard frame header by a communication protocol as an available (e.g. unused or redefined) bit in the frame header (herein called the measurement bit). The standard protocol is unchanged by the selection of this bit. An application is selected to be monitored. The selected bit is then set in each network packet that is generated by the selected application. The fabric collects performance data for each packet that has the bit set. Thus, the fabric collects performance data about a transmission of each packet that is generated by the application when that application is setting the bit.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4*a* and 4*b* together illustrate a high level flow chart that depicts a first embodiment of a performance manager utilizing a protocol frame header bit to identify packets or frames that are associated with a particular group of applications in accordance with the present invention;

FIG. 8 depicts a high level flow chart that illustrates a second embodiment of a statistics monitor in a fabric collecting performance data statistics associated with the execution of packets or frames that have a protocol frame header bit that is set in accordance with the present invention.

DETAILED DESCRIPTION OF THE PREFERRED EMBODIMENT

Figure 1:
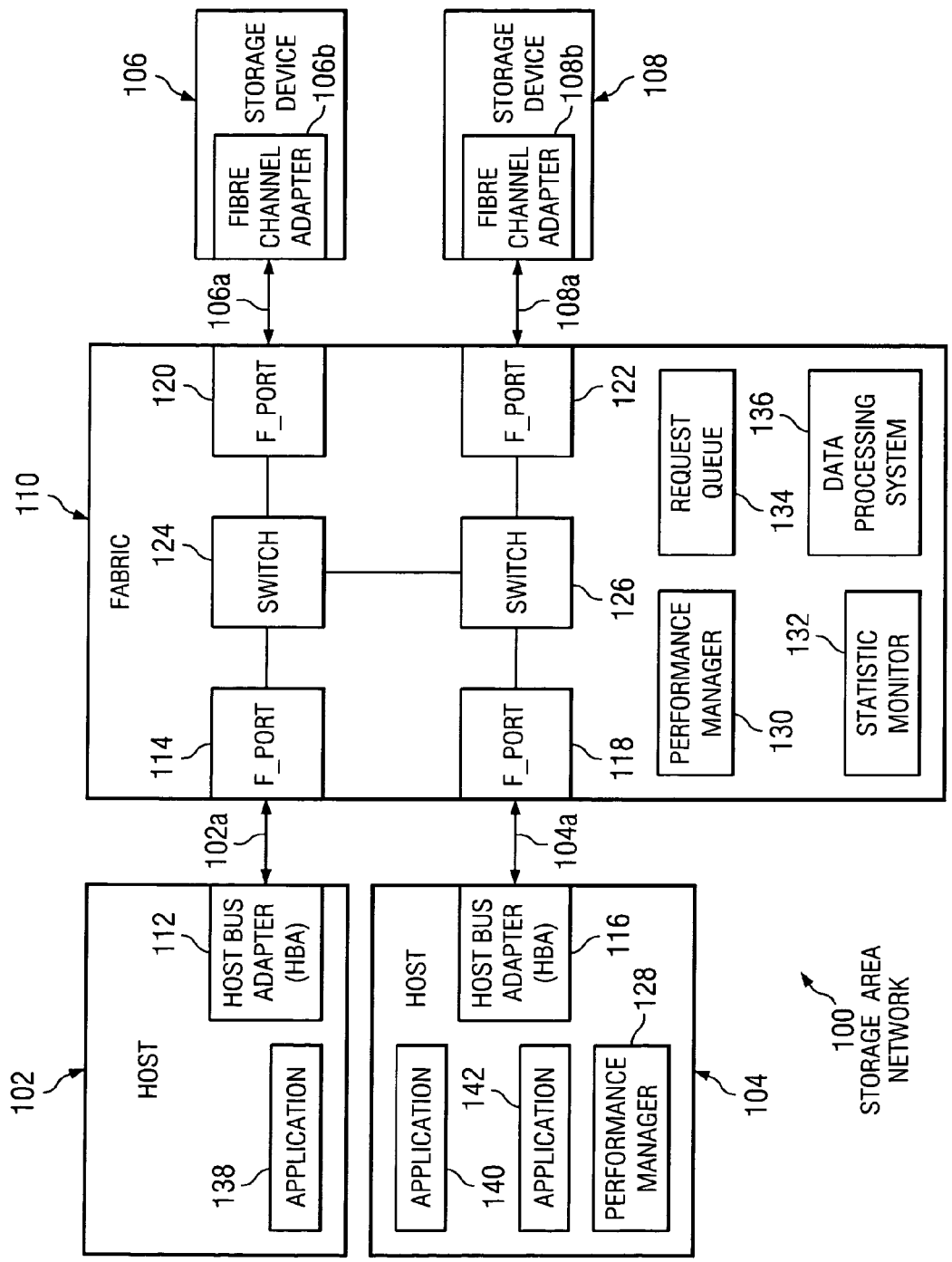
FIG. 1 is a block diagram of a storage area network that includes multiple data processing systems that are coupled together utilizing a fabric in accordance with the present invention.

A preferred embodiment of the present invention and its advantages are better understood by referring to the figures, like numerals being used for like and corresponding parts of the accompanying figures.

The present invention is a method, apparatus, and computer program product for collecting performance data for selected applications utilizing a single bit in communications frames generated by the applications. The bit is already defined by the communications protocol standard as being part of the frame header and is currently available. Therefore, the present invention does not require an incompatible change to alter the preexisting protocol standard. The present invention takes advantage of a bit that is already defined as being part of the standard frame header. This bit is either defined by the standard as being unused, or is otherwise available. The bit may have been defined within the protocol for a particular use but has been redefined by the present invention to be used as the measurement bit.

The fabric collects performance data about the processing of all packets that have the bit set. The fabric is unaware of which application set the bit. Thus, to collect performance data for the selected application, the application sets the bit in all packets that are generated by the application while all other applications refrain from setting the bit in packets that are generated by those applications. Therefore, all packets that are being processed by the fabric that have the bit set were generated by the application that is currently permitted to set the bit. When the fabric collects performance data about the packets that have the bit set, the fabric is collecting performance data about the packets that were generated by the application.

The present invention uses a single existing bit in the frame header to identify selected applications or application groups. Most communications protocols have one or two available bits already defined in the frame header as part of the standard definition of the protocol. An existing available bit that is already defined by the protocol in the frame header is used by the present invention. This bit is then set or cleared by an application when a packet is generated by the application. When a packet that includes a frame header that has this bit set is transmitted through the fabric, statistical performance data is collected by the fabric about the processing of this packet, such as, which switches the packet traveled through and how long a packet took to travel through these switches. Performance data for each selected application or group of applications is collected separately from the data that is collected for the other applications or groups of applications.

The present invention can be used to collect data for individual applications or for groups of applications. For example, when the data is to be collected for individual applications, only one application at a time will set the bit when the application generates a network packet. When data is to be collected for a group of applications, each application in the group will set the bit when applications in that group generate a network packet. When data is collected for a group of applications, the collected data will reflect the processing of the entire group. Thus, when collecting data for a group of applications, there will be no way to distinguish the data that is attributed to any one of the applications in the group individually.

However, if the performance of a single application is needed, that application alone could set the bit allowing the data to be collected just for that application. In this case, the collected data would reflect the performance of just that one application.

The following discussion will describe data being collected for selected groups of applications. Those skilled in the art will recognize, however, that the data may be collected instead on an individual application basis.

When performance data collection for a particular group of applications is to occur, frames sent by all applications in the group set the bit to one. Frames sent by all other applications set the bit to zero, i.e. clear the bit. After a data accumulation time period expires, a performance manager collects the performance data from the fabric. The collected data pertains to the application group that is currently setting the bit to one. After the data is collected for this group of applications, data can be collected for a next group of applications in a similar manner. Data collection for a third group can begin after completion of collection of data for the second group. Repeated cycles of data collection on a group can be performed from time to time permitting averaging of the performance data over a long period of time.

Some of the advantages of the present invention include the following:

(1) Only a single bit is needed and used in the frame header. Since most existing protocols already have at least one available bit in the standard frame header definition, the standard frame header definition need not be altered. The protocol standard does not need to be modified in order to implement the present invention. This eliminates any hardware impact and bandwidth decrease that results from the prior art approach of adding additional bits to the protocol standard definition of a frame header.

(2) The fabric needs to collect only a single set of performance data at a time. Thus, performance data for only one application or group of applications is collected at one time. The fabric does not need to collect and manage performance data for multiple applications or groups simultaneously.

(3) There is no upper limit on the number of applications or groups for which data can be collected. Prior art approaches would have an upper limit that is equal to $2^n$, where n is the number of bits used to identify an application or group.

The present invention provides two embodiments for accumulating performance data. According to the first embodiment, the statistics monitor resets its counters, timers, and other components that are used to accumulate performance data each time the statistics monitor is enabled to collect data. Thus, each time a new group of applications is being monitored, the statistics monitor's components are reset. The statistics monitor then collects data that is later retrieved by the performance manager for analysis.

According to the second embodiment, the statistics monitor does not reset its counters, timers, and other components when a new group of applications is being monitored. The statistics monitor will just add to the values that are currently indicated by the counters, timers, and components when a new group of applications is monitored. In this case, the performance manager will collect a baseline set of data at the beginning of the monitoring process for a new group of applications. The statistics manager then accumulates performance data for this group of applications in addition to the data that was already stored in the counters, timers, and components. At the end of the monitoring process, the performance manager then obtains a final set of data from the statistics monitor. The performance monitor then generates a resulting set of data by subtracting the baseline set of data from the final set of data. Appropriate adjustments are made for counters, timers, and components which may have wrapped. The resulting set of data then reflects the performance of just that group of applications.

FIG. 1 is a block diagram of a storage area network that includes multiple data processing systems that are coupled together utilizing a fabric in accordance with the present invention. FIG. 1 depicts a storage area network (SAN) 100 in accordance with the present invention. SAN 100 includes multiple end nodes, such as host 102, host 104, storage device 106, and storage device 108. Each end node is coupled to fabric 100 utilizing a fibre channel link. For example, host 102 is coupled to fabric 110 utilizing link 102a. Host 104 is coupled to fabric 110 utilizing link 104a; storage device 106 is coupled to fabric 110 utilizing link 106a; and storage device 108 is coupled to fabric 110 utilizing link 108a.

Each host is coupled to its fibre channel link using a Host Bus Adapter (HBA). For example, HBA 112 is coupled to an F_Port 114 utilizing link 102a; and HBA 116 is coupled to F_Port 118 utilizing link 104a. Storage device 106, including a Fibre Channel Adapter 106b, is coupled to F_Port 120 utilizing link 106a; and storage device 108, including a Fibre Channel Adapter 108b, is coupled to F_Port 122 utilizing link 108a.

Fabric 110 includes one or more switches, such as switches 124 and 126, for switching network packets through fabric 110.

According to the present invention, SAN 100 also includes one or more performance managers, such as performance managers 128 and 130. One, some, or all of the performance managers included in SAN 100 may be executed within one or more end nodes, within one or more end nodes and the fabric, or within only the fabric. For example, SAN 100 might include only one performance manager, such as a performance manager 128 which is included in host 104. Alternatively, SAN 100 could include a performance manager in each end node.

Fabric 110 also includes a statistics monitor 132, a request queue 134, and a data processing system 136. Statistics monitor 132 gathers data about packets as the packets travel through fabric 110. The process of actually gathering statistics from the various components of the fabric is known in the prior art and not described herein. The present invention is concerned with when to gather the statistics and not how those statistics are actually acquired.

Request queue 134 is provided for storing requests, from one or more performance managers, to acquire permission to set the bit. These requests are queued in request queue 134 and are processed in the order in which they are received.

Requests may be sent to fabric 110 either "in band" or "out of band". "In band" requests are requests that are sent using the facilities of fabric 110 by sending FibreChannel frames from an end node to the fabric 110. "Out of band" requests are requests that are received by the fabric 110 using some other communication means, such as via the Ethernet standard, wireless communications, or other communications means. The present invention processes received requests as described herein regardless of the communications means used to transmit the request to the fabric.

One or more applications, such as applications 138, 140, and 142 exist within SAN 100. The applications may execute in the same or in different end nodes. For example, application 138 is being executed by host 102, while applications 140 and 142 are being executed by host 104. Further, many additional applications (not shown) will also typically exist. These applications may be grouped into different application groups. The process of selecting which applications are to be grouped together is not relevant to the present invention. Any known method for selecting applications to group together can be used. For example, a group of applications could include applications 138 and 142. A different group of applications could include applications 140 and 142, or applications 138, 140, and 142, as well as other applications.

Figure 2:
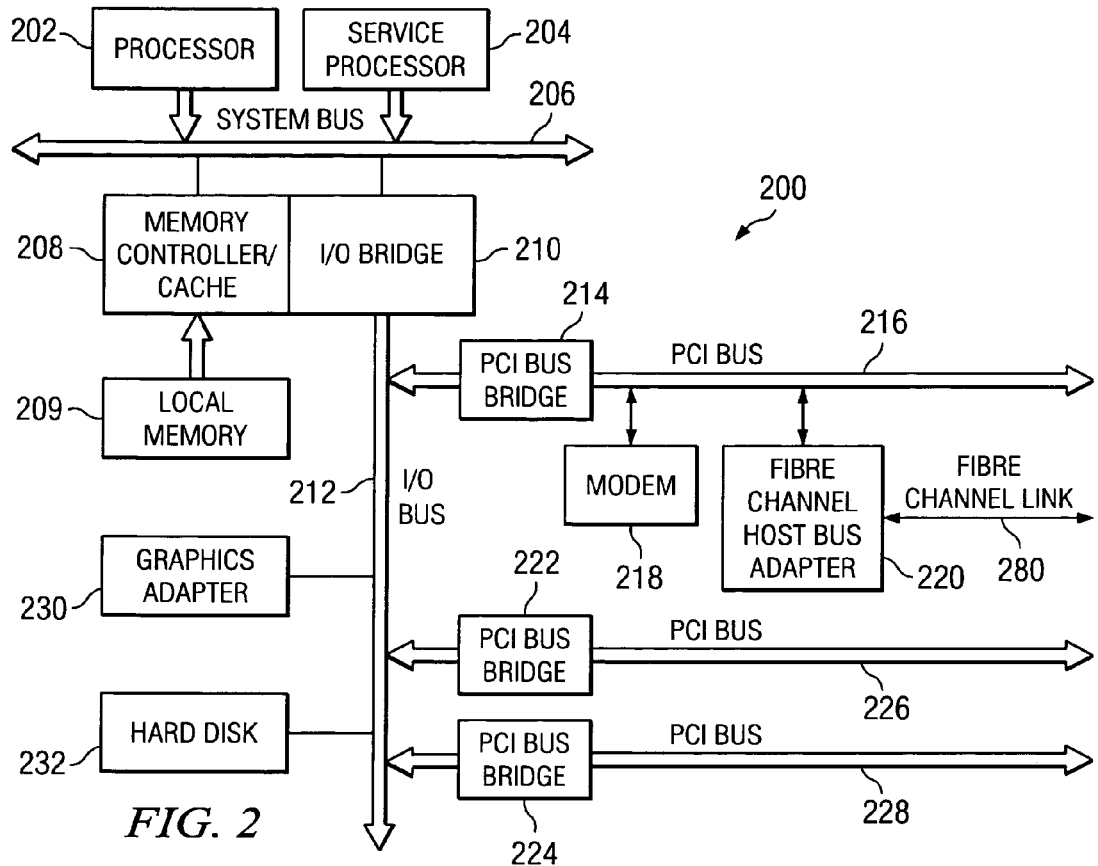
FIG. 2 is a block diagram of a data processing system that may be used to implement any of the data processing systems of FIG. 1 in accordance with the present invention.

FIG. 2 is a block diagram of a data processing system that may be used to implement any of the data processing systems of FIG. 1 in accordance with the present invention. Data processing system 200 may be a symmetric multiprocessor (SMP) system including a plurality of processors 202 and 204 connected to system bus 206. Alternatively, a single processor system may be employed. In the depicted example, processor 204 is a service processor. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of I/O adapters, such as modems 218 may be connected to PCI bus 216. Typical PCI bus implementations will support four PCI expansion slots or add-in connectors. Communications links to network computers 112 and 116 in FIG. 1 may be provided through modem 218 and Fibre channel host bus adapter 220 connected to PCI local bus 216 through add-in boards.

Host Bus Adapter (HBA) 220 enables data processing system 200 to send and receive message from fabric 110 via a fibre channel link 280.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Figure 3A:
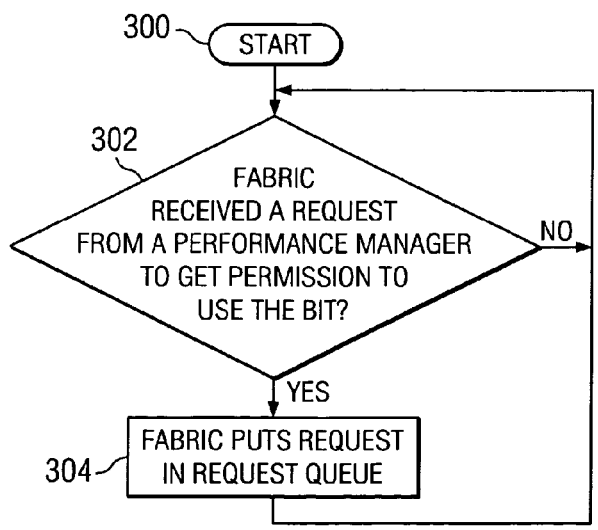
FIG. 3*a* illustrates a high level flow chart that depicts a fabric receiving requests for permission to use a protocol frame header bit and queuing those requests in a request queue in accordance with the present invention.

FIG. 3*a* illustrates a high level flow chart that depicts a fabric receiving requests for permission to use the measurement bit and queuing those requests in a request queue in accordance with the present invention. The process starts as depicted by block 300 and thereafter passes to block 302 which illustrates a determination of whether or not the fabric has received from a performance manager a request to get permission to use the measurement bit. If a determination is made that the fabric has not received a request for permission to use the measurement bit, the process passes back to block 302. If a determination is made that the fabric has received a request from a performance manager for permission to use a protocol frame header bit, the process passes to block 304 which illustrates the fabric putting the request in a request queue. The process then passes back to block 302.

Figure 3B:
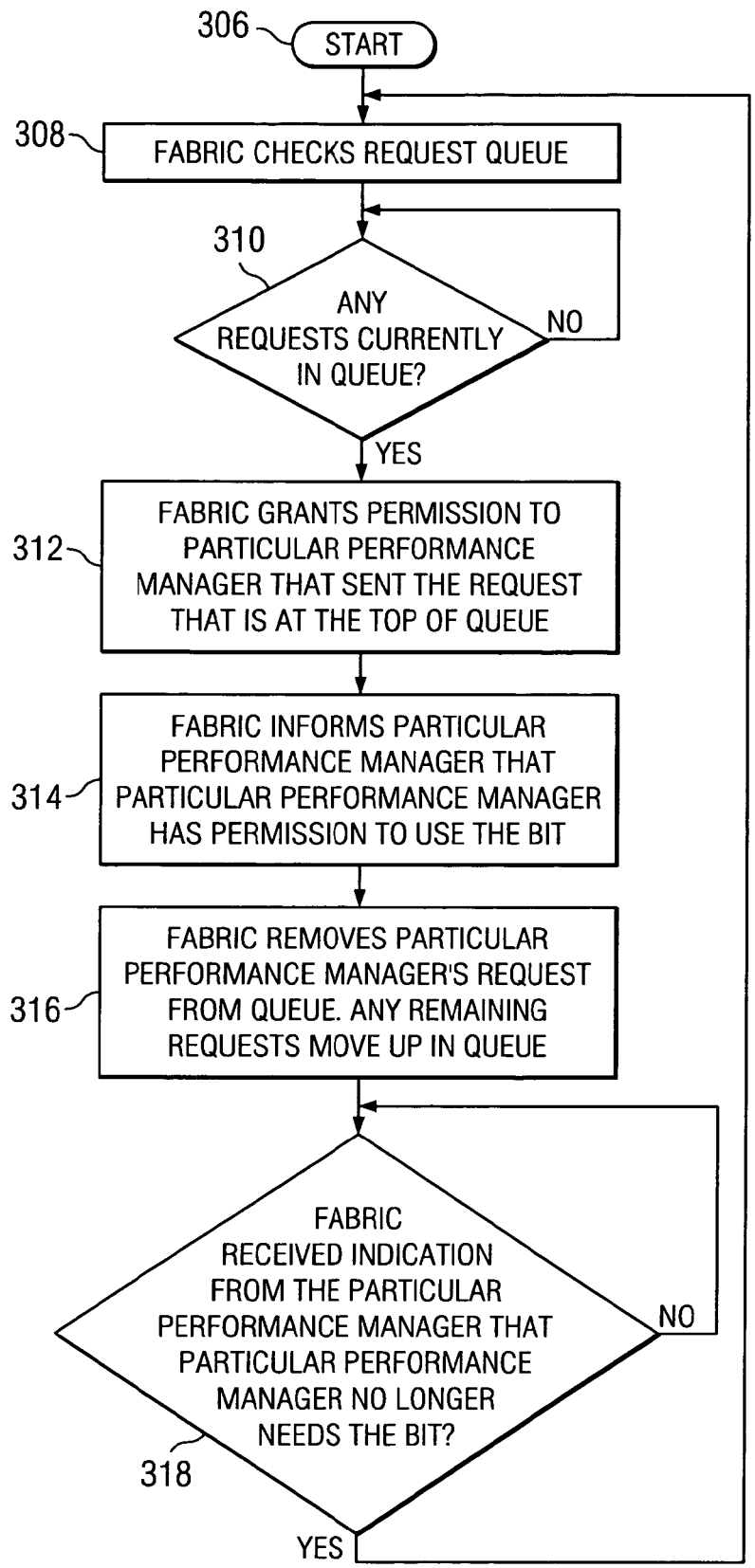
FIG. 3*b* depicts a high level flow chart that executes concurrently with the process of FIG. 3*a* and that illustrates a fabric processing requests from a request queue for permission to use a protocol frame header bit in accordance with the present invention.

FIG. 3*b* depicts a high level flow chart that executes concurrently with the process of FIG. 3*a* and that illustrates a fabric processing requests from a request queue for permission to use a protocol frame header bit in accordance with the present invention. The process starts as depicted by block 306 and thereafter passes to block 308 which illustrates the fabric checking a request queue. Next, block 310 depicts a determination of whether or not there are any requests currently stored in the request queue. If a determination is made that there are no requests currently stored in the request queue, the process passes back to block 310. If a determination is made that there is at least one request currently stored in the request queue, the process passes to block 312 which illustrates the fabric granting permission to the particular performance manager that sent the request that is currently at the top of the request queue.

The process then passes to block 314 which depicts the fabric informing the particular performance manager that it has permission to use the protocol frame header bit. No performance manager may use the bit until that performance manager receives permission to use the bit. When one performance manager has permission to use the bit, the other performances managers cannot use the bit. The other performance managers must wait to be granted permission to use the bit before they can use the bit. Thus, when one performance manager has permission to use the bit, only that performance manager and no other controls the setting and clearing of the bit by the various applications in the system. Block 316, then, illustrates the fabric removing the particular performance manager's request from the queue. Any requests that currently remain in the queue then move up in the queue so that the request that had been the second request is now the top request. Thereafter, block 318 depicts a determination of whether or not the fabric has received an indication from the particular performance manager that the particular performance manager no longer needs the bit. If a determination is made that the fabric has not received an indication that the particular performance manager no longer needs the bit, the process passes back to block 318. If a determination is made that the fabric has received an indication that the particular performance manager no longer needs the bit, the process passes back to block 308.

Figure 4A:
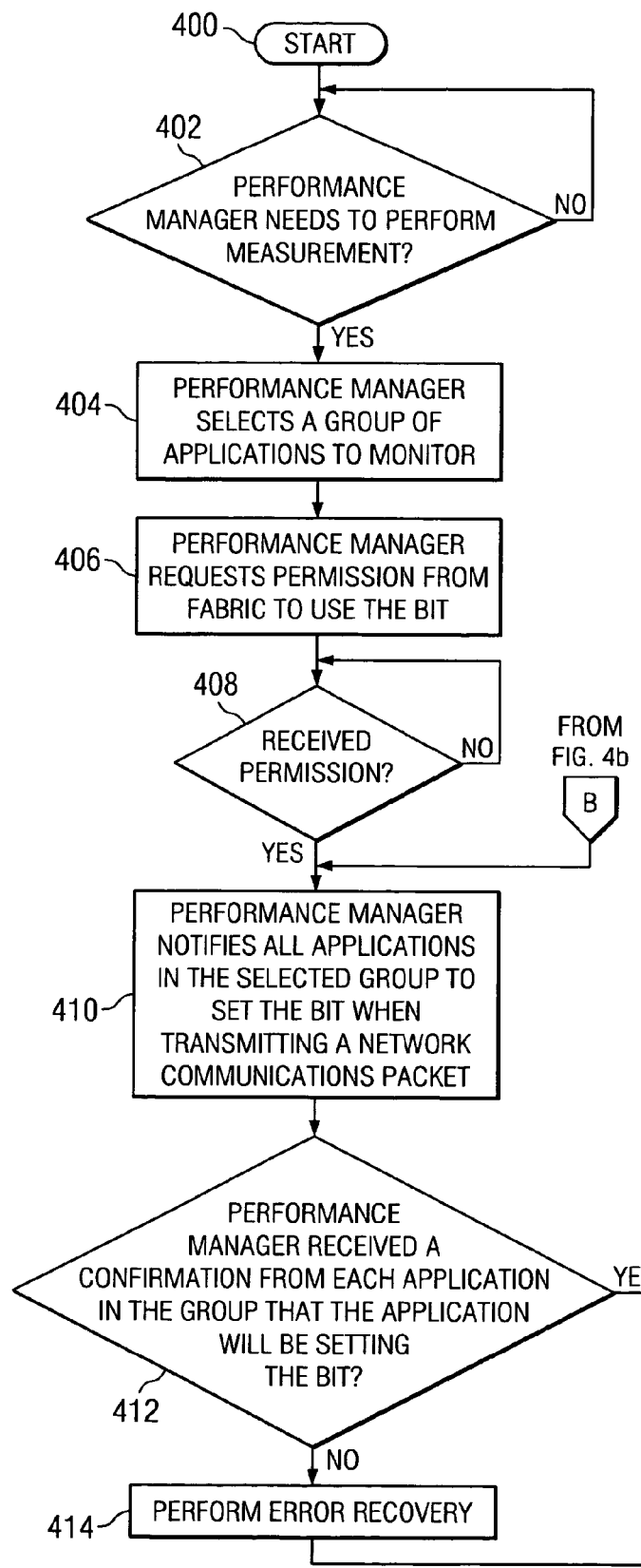
Figure 4A:
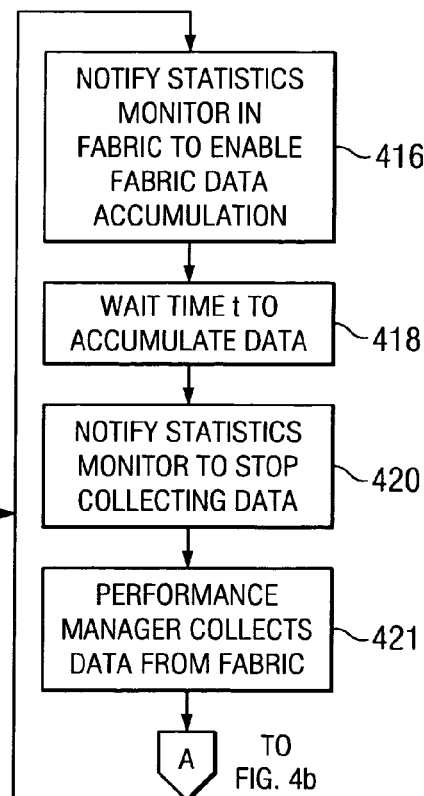

FIGS. 4*a* and 4*b* together illustrate a high level flow chart that depicts a first embodiment of a performance manager utilizing a protocol frame header bit to identify packets or frames that are associated a particular group of applications in accordance with the present invention. The process starts as depicted by block 400 and thereafter passes to block 402 which illustrates a determination of whether or not the performance manager needs to perform a measurement on one or more applications. If a determination is made that the performance manager does not need to perform a measurement, the process passes back to block 402. If a determination is made that the performance manager does need to perform a measurement, the process passes to block 404 which depicts the performance manager selecting a group of one or more applications it needs to monitor. Thereafter, block 406 illustrates the performance manager requesting permission from the fabric to use the protocol frame header bit.

Block 408, then, depicts a determination of whether or not the performance manager has received permission from the fabric to use the bit. If a determination is made that the performance manager has not received permission, the process passes back to block 408. If a determination is made that the performance manager has received permission, the process passes to block 410.

Block 410, then, illustrates the performance manager notifying all applications in the selected group to set the protocol frame header bit when transmitting a network communications packet or fibre channel frame. The process then passes to block 412 which depicts a determination of whether or not the performance manager has received a confirmation from each application in the group that the application will be setting the bit. If after waiting a sufficient amount of time a determination is made that the performance manager has not received a confirmation from each application in the group that the application will be setting the bit, the process passes to block 414 which illustrates performing an error recovery. The process then passes to block 416.

Referring again to block 412, if a determination is made that that the performance manager has received a confirmation from each application in the group that the application will be setting the bit, the process passes to block 416 which depicts the performance manager notifying the statistics monitor in the fabric to enable the fabric to accumulate performance data statistics. Next, block 418 illustrates waiting for a time "t" to permit the fabric to collect data. Thereafter, block 420 depicts the performance manager notifying the statistics monitor in the fabric to disable the fabric from accumulating performance data statistics. Block 421, then, illustrates the performance manager collecting the accumulated performance data statistics from the fabric and resetting the fabric's counters, timers and components.

The process then passes to block 422 (see FIG. 4*b*) which depicts the performance manager notifying all applications in the selected group to stop setting the bit when transmitting network communications packets. Next, block 424 illustrates the performance manager determining whether it has received a confirmation from each application in the group that the application will stop setting the bit. If after waiting a sufficient amount of time, the performance manager determines that it has not received a confirmation from each application in the group that the application will stop setting the bit, the process passes to block 426 which depicts performing error recovery. The process then passes to block 428.

Referring again to block 424, if the performance manager determines that it has received a confirmation from each application in the group that the application will stop setting the bit, the process passes to block 428. Block 428 illustrates a determination of whether or not there are any other groups of applications that the performance manager needs to monitor. If a determination is made that there are other groups that the performance manager needs to monitor, the process passes to block 410 (see FIG. 4*a*). Referring again to block 428, if a determination is made that there are no other groups that the performance manager needs to monitor, the process passes to block 430 which depicts the performance manager notifying the fabric that the performance manager no longer needs the bit. The process then terminates as illustrated by block 432.

According to another implementation, block 422 may be executed at the same time block 420 is executed, or it may be executed prior to block 420. Such modifications are obvious to one skilled in the art and we do not intent to exclude them.

Figure 5:
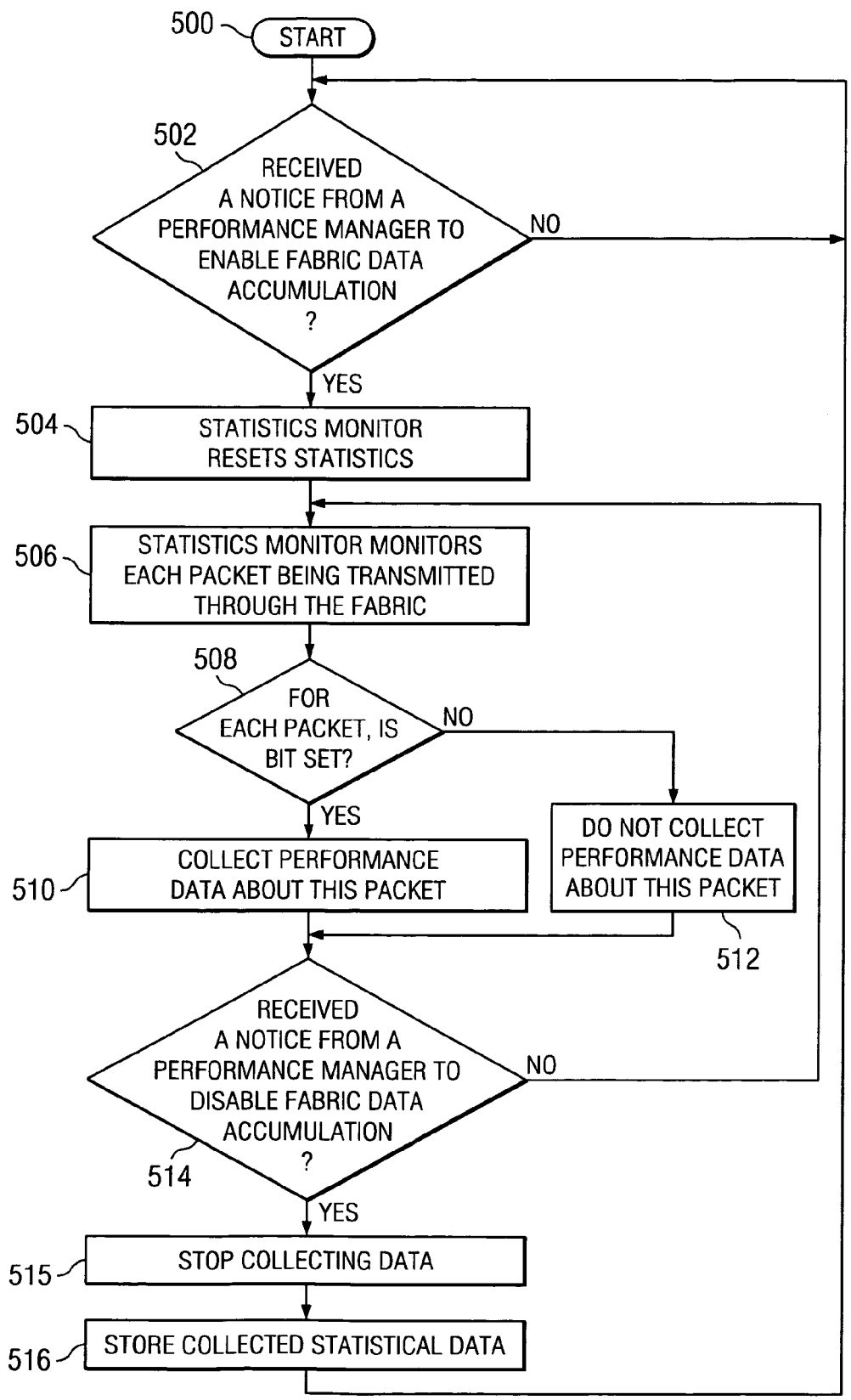
FIG. 5 depicts a high level flow chart that illustrates a first embodiment of a statistics monitor in a fabric collecting performance data statistics associated with the execution of packets that have a protocol frame header bit that is set in accordance with the present invention.

FIG. 5 depicts a high level flow chart that illustrates a first embodiment of a statistics monitor in a fabric collecting performance data statistics associated with the execution of packets that have a protocol frame header bit that is set in accordance with the present invention. The process described by FIG. 5 is executed when the process described by FIGS. 4*a* and 4*b* is executed.

The process depicted by FIG. 5 starts as illustrated by block 500 and thereafter passes to block 502 which depicts a determination of whether or not the statistics monitor has received a notice from a performance manger to enable the fabric to start collecting data. If a determination is made that the statistics monitor has not received such a notice, the process passes back to block 502. If a determination is made that the statistics monitor has received such a notice, the process passes to block 504 which illustrates the statistics monitor resetting all of the components in the statistics monitor. This resets all counters, timers, and other components in the statistics monitor used in statistical performance data accumulation so that they do not currently indicate any accumulated data.

The process then passes to block 506 which depicts the statistics monitor monitoring each packet that is transmitted through the fabric. Next, block 508 illustrates a determination that is made for each packet of whether or not the protocol frame header bit is set in that packet. If a determination is made that the bit is set, the process passes to block 510 which depicts the statistics monitor collecting performance data about this packet. The process then passes to block 514.

Referring again to block 508, if a determination is made that the bit is not set, the process passes to block 512 which depicts the statistics monitor not collecting performance data about this packet. In another embodiment, instead of not collecting performance data at all, "base line" statistics may be collected for all packets (i.e. with bits set and not set) in a general bucket, and used for comparison with statistics for a group.

The process then passes to block 514. Block 514 illustrates a determination of whether or not the statistics monitor has received a notice from the performance manager to disable fabric data accumulation. If a determination is made that the statistics monitor has not received a notice from the performance manager to disable fabric data accumulation, the process passes to block 506. Referring again to block 514, if a determination is made that the statistics monitor has received a notice to disable fabric data accumulation, the process passes to block 515 which depicts the statistic monitor stopping the collection of performance data statistics. Next, block 516 illustrates the statistics monitor storing the collected statistical performance data. The process then passes back to block 502.

Figure 6:
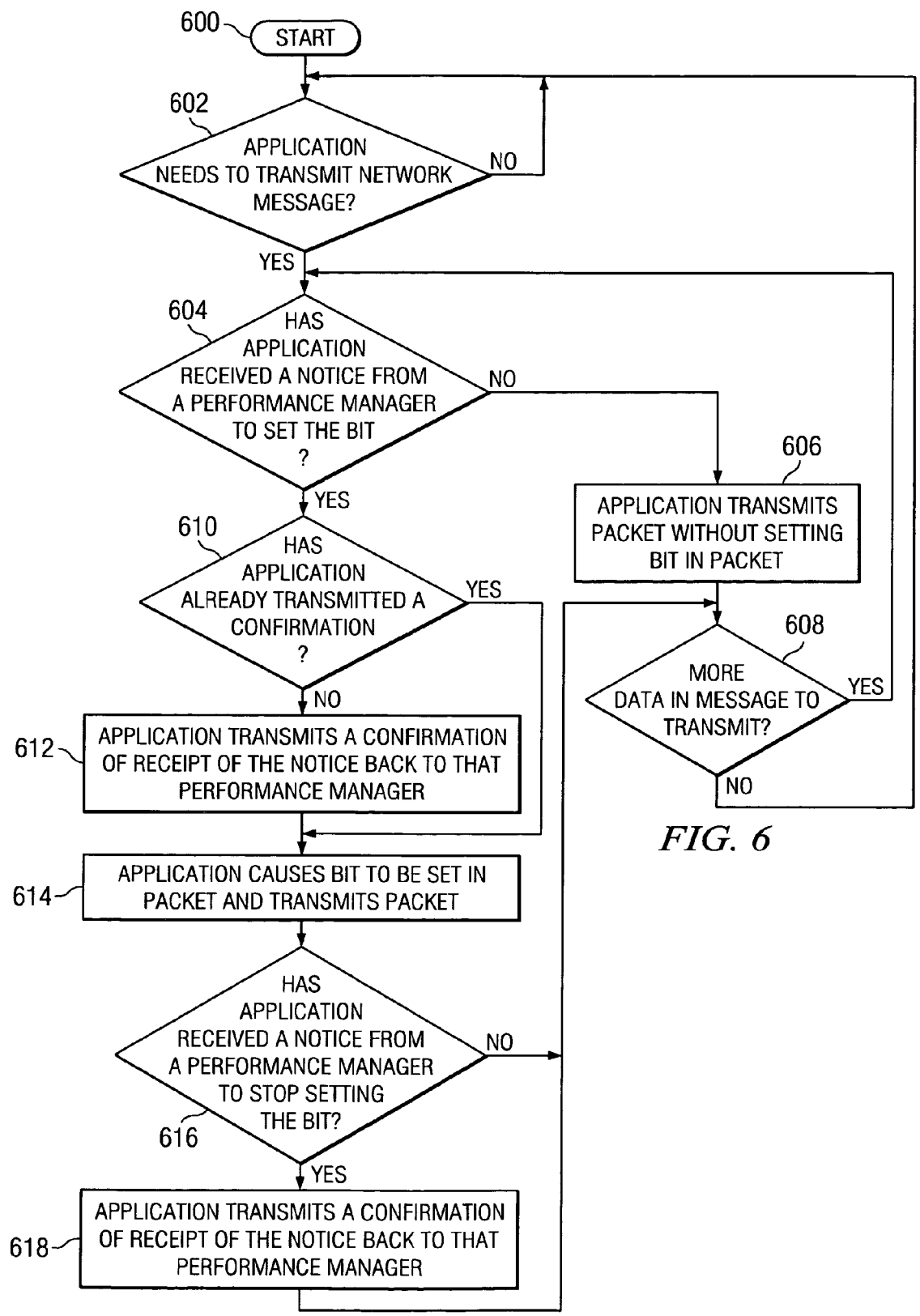
FIG. 6 illustrates a high level flow chart that depicts an application setting a protocol frame header bit in packets or frames that are transmitted for the application in response to a notice from a performance manager in accordance with the present invention.

FIG. 6 illustrates a high level flow chart that depicts an application setting a protocol frame header bit in packets or frames that are transmitted for the application in response to a notice from a performance manager in accordance with the present invention. The process starts as depicted by block 600 and thereafter passes to block 602 which illustrates a determination of whether or not the application needs to transmit a network message that will be transmitted using one or more network packets. If a determination is made that the application does not need to transmit a network message, the process passes back to block 602. If a determination is made that the application does need to transmit a network message, the process passes to block 604 which depicts a determination of whether or not the application has received a notice from a performance manager to set the network protocol frame bit. If a determination is made that the application has not received a notice from a performance manager to set the frame bit, the process passes to block 606 which illustrates the application transmitting a network packet that includes the message without setting the bit in the packet. Block 608, then, depicts a determination of whether or not there is more data in the network message that remains to be transmitted. If a determination is made that there is no more data in the message, the process passes to block 602. Referring again to block 608, if a determination is made that there is more data in the network message that needs to be transmitted, the process passes to block 604.

Referring again to block 604, if a determination is made that the application has received a notice from a performance manager to set the bit, the process passes to block 610. Block 610 depicts a determination of whether or not the application has already transmitted a confirmation to the performance manager that the application will begin setting the bit. If a determination is made that the application has not already transmitted a confirmation to the performance manager, the process passes to block 612 which illustrates the application transmitting a confirmation of receipt of the notice back to that performance manager that the application will begin setting the bit. The process then passes to block 614. Referring again to block 610, if a determination is made that the application has already transmitted a confirmation to the performance manager, the process passes to block 614.

Block 614 illustrates the application causing the bit to be set in each network packet generated by that application and then transmitting the network packets including the set bit to the fabric. The process of causing the bit to be set in the network packet might involve requesting a piece of trusted firmware to set the bit. The trusted firmware would not set the bit unless the application had permission to set it. This step could be executed if the applications could not be trusted to only set the bit when they had permission. The fabric then transmits the packet to its intended destination end node. As the packet is transmitted by the fabric, the packet will traverse various switches and other fabric components. As the packet traverses these various switches and other fabric components, statistical performance data will be collected and accumulated by the statistics monitor. Next, block 616 depicts a determination of whether or not the application has received a notice from a performance manager to stop setting the bit. If a determination is made that the application has not received a notice from a performance manager to stop setting the bit, the process passes to block 608. Referring again to block 616, if a determination is made that the application has received a notice from a performance manager to stop setting the bit, the process passes to block 618 which depicts the application transmitting a confirmation of receipt of the notice back to that performance manager, and clears (or resets) the indication that the application has "received a notice from the performance manager to set the bit". The process then passes to block 608.

Figure 7A:
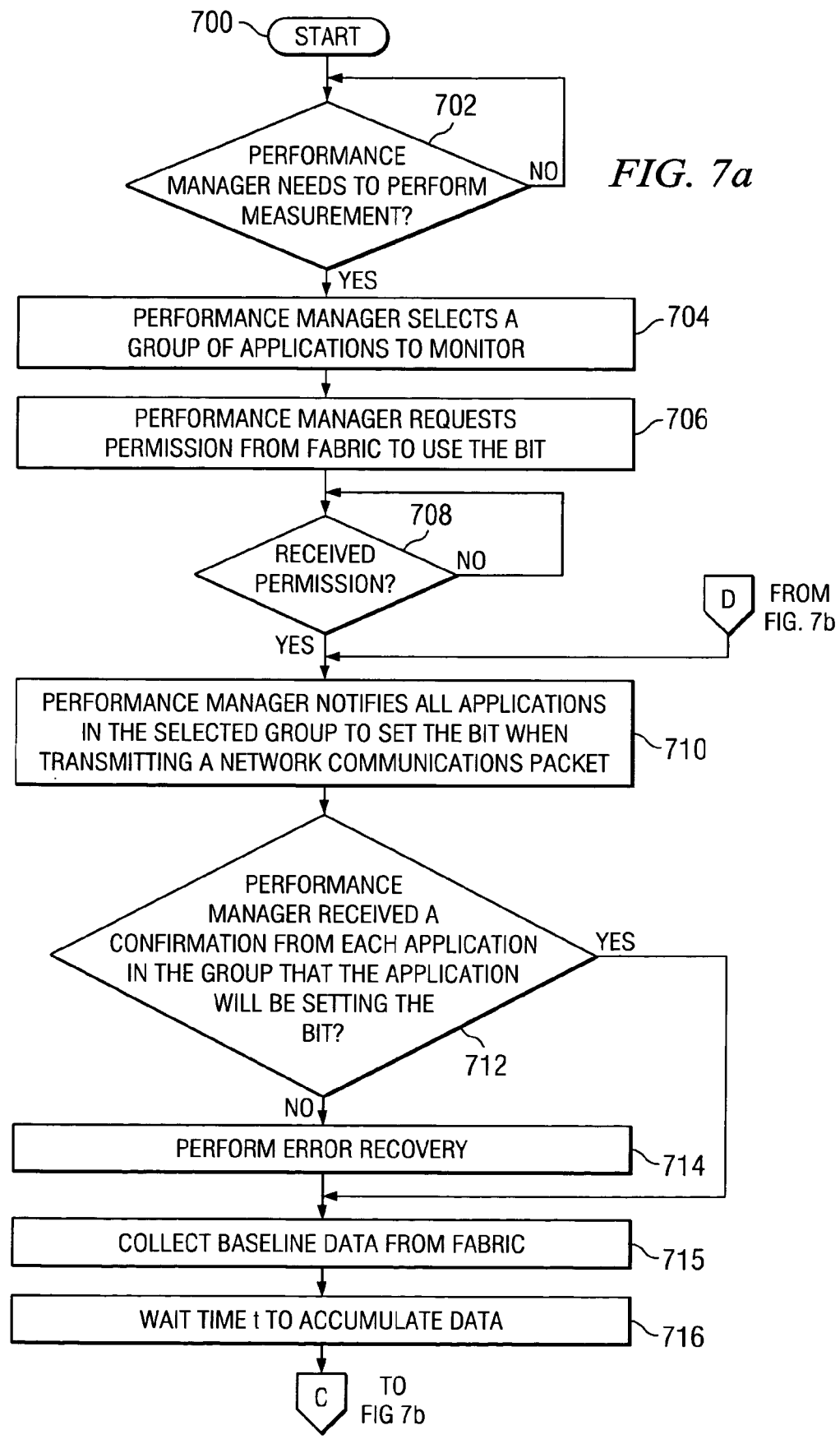
FIGS. 7*a* and 7*b* together illustrate a high level flow chart that depicts a second embodiment of a performance manager utilizing a protocol frame header bit to identify packets or frames that are associated with a particular group of applications in accordance with the present invention.
Figure 7B:
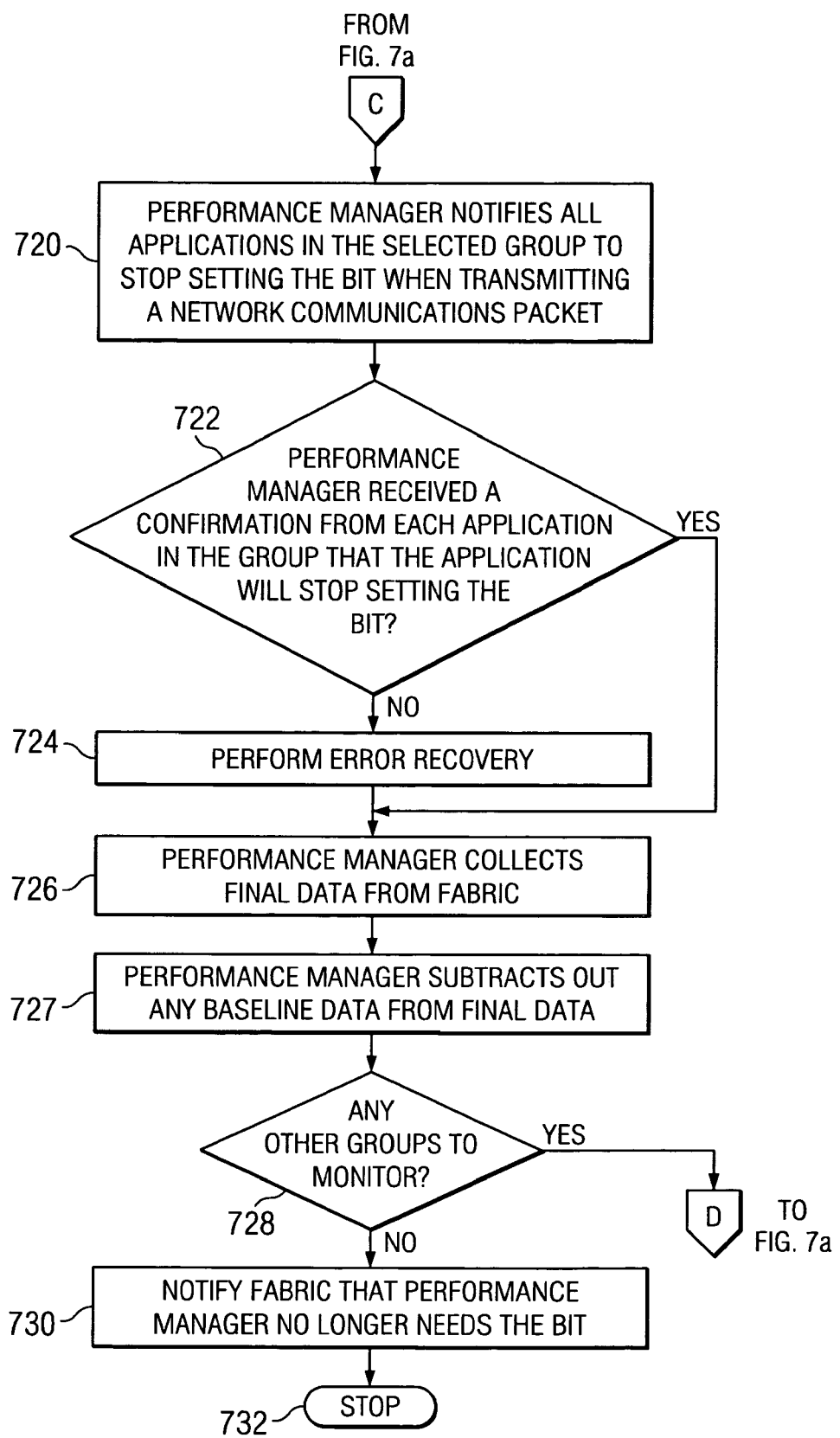

FIGS. 7a and 7b together illustrate a high level flow chart that depicts a second embodiment of a performance manager utilizing a protocol frame header bit to identify packets or frames that are associated with a particular group of applications in accordance with the present invention. The process starts as depicted by block 700 and thereafter passes to block 702 which illustrates a determination of whether or not a performance manager needs to perform a measurement on one or more groups of applications. If a determination is made that the performance manager does not need to perform a measurement on one or more groups of applications, the process passes back to block 702. If a determination is made that a performance manager does need to perform a measurement, the process passes to block 704 which depicts the performance manager selecting a group of one or more applications it needs to monitor. Thereafter, block 706 illustrates the performance manager requesting permission from the fabric to use the protocol frame header bit.

Block 708, then, depicts a determination of whether or not the performance manager has received permission from the fabric to use the bit. If a determination is made that the performance manager has not received permission, the process passes back to block 708. If a determination is made that the performance manager has received permission, the process passes to block 710.

Block 710, then, illustrates the performance manager notifying all applications in the selected group to set the protocol frame header bit when transmitting a network communications packet. The process then passes to block 712 which depicts a determination of whether or not the performance manager has received a confirmation from each application in the group that the application will be setting the bit. If a determination is made that the performance manager has not received a confirmation from each application in the group that the application will be setting the bit after waiting a sufficient amount of time, the process passes to block 714 which illustrates performing an error recovery. The process then passes to block 715.

Referring again to block 712, if a determination is made that that the performance manager has received a confirmation from each application in the group that the application will be setting the bit, the process passes to block 715 which depicts the performance manager collecting a baseline set of statistics data from the fabric. This baseline set of statistics data is the current value of the various counters and timers that are used to store data as it is collected by the statistics monitor. Next, block 716 illustrates waiting for a time "t" to permit the fabric to collect additional data.

The process then passes to block 720 (see FIG. 7b) which depicts the performance manager notifying all applications in the selected group to stop setting the bit when transmitting network communications packets. Next, block 722 illustrates the performance manager determining whether it has received a confirmation from each application in the group that the application will stop setting the bit. If the performance manager determines that it has not received a confirmation from each application in the group that the application will stop setting the bit after waiting a sufficient amount of time, the process passes to block 724 which depicts performing error recovery. The process then passes to block 726.

Referring again to block 722, if the performance manager determines that it has received a confirmation from each application in the group that the application will stop setting the bit, the process passes to block 726. Block 726 illustrates the performance manager collecting final statistics data from the fabric. This final statistics data reflects the baseline data that the statistics monitor started with plus the additional statistics data the statistics monitor collected for the particular group of applications now being monitored. Next, block 727 depicts the performance manager subtracting out any baseline data from the final data to create resulting data. Therefore, the resulting data is the statistics data that is attributed to just the group of applications that are currently being monitored.

Thereafter, block 728 illustrates a determination of whether or not there are any other groups of applications that the performance manager needs to monitor. If a determination is made that there are other groups that the performance manager needs to monitor, the process passes to block 710 (see FIG. 7a). Referring again to block 728, if a determination is made that there are no other groups that the performance manager needs to monitor, the process passes to block 730 which depicts the performance manager notifying the fabric that the performance manager no longer needs the bit. The process then terminates as illustrated by block 732.

FIG. 8 depicts a high level flow chart that illustrates a second embodiment of a statistics monitor in a fabric collecting performance data statistics associated with the execution of packets or frames that have a protocol frame header bit that is set in accordance with the present invention. The process described by FIG. 8 is executed when the process described by FIGS. 7a and 7b is executed. The process starts as depicted by block 800 and thereafter passes to block 802 which illustrates the statistics monitor monitoring each network packet that is transmitted through the fabric. Next, block 804 depicts a determination that is made for each packet of whether or not the protocol frame header bit is set in that packet. If a determination is made that the bit is set, the process passes to block 806 which depicts the statistics monitor collecting performance data about this packet. The process then passes to block 804. Referring again to block 804, if a determination is made that the bit is not set, the process passes to block 808 which depicts the statistics monitor not collecting performance data about this packet. The process then passes to block 804.

It is important to note that while the present invention has been described in the context of a fully functioning data processing system. Those of ordinary skill in the art will appreciate that the processes of the present invention are capable of being distributed in the form of a computer readable medium of instructions and a variety of forms. Examples of computer readable media include recordable-type media, such as a floppy disk, a hard disk drive, a RAM, CD-ROMs, DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus in a communications network fabric, that is used to couple data processing systems together, for collecting data about the transmission of network packets, associated with specified applications, through said fabric, said apparatus comprising:

a network fabric having an application to generate a particular existing single bit selected in a standard definition of a frame header, said bit already being defined by a communication protocol standard as an available bit in said frame header definition, said protocol standard being unchanged by said selection; the application being specified to be monitored;

said selected bit being set in each network packet that is generated by said specified application;

said fabric collecting performance data about a transmission of each packet through said fabric that has said bit set;

said fabric collecting performance data about a transmission of each packet that is generated by said application;

a performance manager requesting permission to use said single bit;

said fabric determining whether a performance manager other than said performance manager currently has permission to use said single bit;

in response to determining that no performance manager other than said performance manager currently has permission to use said single bit, said fabric granting permission to said performance manager to use said bit; and in response to determining that another performance manager other than said performance manager currently has permission to use said single bit, said fabric refraining from granting permission to said performance manager to use said bit until said another performance manager other than said performance manager relinquishes said single bit.

2. The apparatus according to claim 1, further comprising:

said performance manager determining whether performance data needs to be collected;

in response to determining that performance data needs to be collected, said performance manager requesting permission to use said bit; and in response to said performance manager receiving permission to use said bit, said performance manager notifying said application to set said bit.

3. The apparatus according to claim 2, further comprising:

said performance manager notifying said fabric to collect said performance data; and said fabric collecting said performance data only in response to being notified to collect said performance data.

4. The apparatus according to claim 3, further comprising:

said performance manager notifying said fabric to stop collecting said performance data;

said fabric stopping collecting said performance data; and said collected data being utilized by said performance manager to determine performance of said application.

5. The apparatus according to claim 4, further comprising:

said performance manager retrieving said collected data.

6. The apparatus according to claim 2, further comprising:

in response to notifying said application to set said bit, said performance manager collecting a baseline set of performance data from said fabric;

said fabric accumulating performance data in addition to said baseline set of performance data;

said performance manager determining that performance data no longer needs to be collected;

in response to determining that performance data no longer needs to be collected, said performance manager collecting a final set of performance data from said fabric;

said performance manager generating resulting performance data by subtracting said baseline set of performance data from said final set of performance data; and said performance manager utilizing said resulting performance data to determine performance of said application.

7. A non-transitory computer readable medium encoded with a computer program for collecting data about the transmission of network packets that are associated with specified applications as said packets are transmitted through a communications network fabric that is used to couple data processing systems together, said computer program comprising:

Instructions for selecting a particular existing single bit in a standard definition of a frame header, said bit already being defined by a communication protocol standard as an available bit in said frame header definition, said protocol standard being unchanged by said selection;

instructions for specifying the application to monitor;

instructions for setting said selected bit in each network packet that is generated by said specified application;

instructions for collecting, by said fabric, performance data about a transmission of each packet through said fabric that has said bit set;

said fabric collecting performance data about a transmission of each packet that is generated by said application;

instructions for requesting, by a performance manager, permission to use said single bit;

instructions for determining whether a performance manager other than said performance manager currently has permission to use said single bit;

in response to determining that no performance manager other than said performance manager currently has permission to use said single bit, instructions for granting permission to said performance manager to use said bit; and in response to determining that another performance manager other than said performance manager currently has permission to use said single bit, instructions for refraining from granting permission to said performance manager to use said bit until said another performance manager other than said performance manager relinquishes said single bit.

8. The computer program according to claim 7, further comprising:

instructions for determining, by said performance manager, whether performance data needs to be collected;

in response to determining that performance data needs to be collected, instructions for requesting, by said performance manager, permission to use said bit; and in response to said performance manager receiving permission to use said bit, instructions for notifying, by said performance manager, said application to set said bit.

9. The computer program according to claim 8, further comprising:

instructions for notifying said fabric to collect said performance data; and instructions for collecting, by said fabric, said performance data only in response to being notified to collect said performance data.

10. The computer program according to claim 9, further comprising:

instructions for notifying said fabric to stop collecting said performance data;

instructions for stopping, by said fabric, collecting said performance data; and instructions for utilizing said collected data by said performance manager to determine performance of said application.

11. The computer program according to claim 8, further comprising:

in response to notifying said application to set said bit, instructions for collecting a baseline set of performance data from said fabric;

instructions for accumulating performance data by said fabric in addition to said baseline set of performance data;

instructions for determining, by said performance manager, that performance data no longer needs to be collected;

in response to determining that performance data no longer needs to be collected, instructions for collecting a final set of performance data from said fabric;

instructions for generating resulting performance data by subtracting said baseline set of performance data from said final set of performance data; and instructions for utilizing said resulting performance data to determine performance of said application.

\* \* \* \* \*